(12) United States Patent
Hald et al.

(10) Patent No.: US 9,648,400 B2
(45) Date of Patent: May 9, 2017

(54) CONSUMPTION METER WITH REMOTE PROGRAM UPDATE

(71) Applicant: Kamstrup A/S, Skanderborg (DK)

(72) Inventors: Flemming Hald, Hadsten (DK); Johnny Dørken Christiansen, Galten (DK)

(73) Assignee: Kamstrup A/S, Skanderborg (DK)

( * ) Notice: Subject to any disclaimer, the term of this patent is extended or adjusted under 35 U.S.C. 154(b) by 255 days.

(21) Appl. No.: 14/398,286

(22) PCT Filed: May 6, 2013

(86) PCT No.: PCT/DK2013/050128
§ 371 (c)(1),
(2) Date: Oct. 31, 2014

(87) PCT Pub. No.: WO2013/167132
PCT Pub. Date: Nov. 14, 2013

(65) Prior Publication Data
US 2015/0116128 A1    Apr. 30, 2015

(30) Foreign Application Priority Data
May 7, 2012    (EP) .................................... 12166957

(51) Int. Cl.
*G08B 23/00*    (2006.01)
*G08C 15/06*    (2006.01)
(Continued)

(52) U.S. Cl.
CPC ................ *H04Q 9/14* (2013.01); *H04Q 9/00* (2013.01); *G06F 8/65* (2013.01); *H04Q 2209/10* (2013.01); *H04Q 2209/60* (2013.01)

(58) Field of Classification Search
CPC .. H04Q 2209/60; H04Q 9/00; H04Q 2209/10; H04Q 9/14; H04B 2203/5433; H04B 3/546; G06F 8/61; G06F 8/65
(Continued)

(56) References Cited

U.S. PATENT DOCUMENTS 8,880,765 B2 * 11/2014 Melvin, Jr. ......... H02J 13/0075
340/870.03
8,947,257 B2 * 2/2015 Ree ........................ G01D 4/002
340/870.01
(Continued)

FOREIGN PATENT DOCUMENTS

| WO | WO 2005/015890 A1 | 2/2005 |
|---|---|---|
| WO | WO 2008/027485 A2 | 3/2008 |
| WO | WO 2008/130991 A1 | 10/2008 |

*Primary Examiner* — Firmin Backer
*Assistant Examiner* — Jerold Murphy
(74) *Attorney, Agent, or Firm* — Renner, Otto, Boisselle and Sklar LLP (57) ABSTRACT

The invention relates to a system of consumption meters (2) arranged in a communication network, where program data of the consumption meters can be updated via the communication network. A data collector (3) is arranged for updating the program data of a group of consumption meters over the network. This is performed by establishing a dedicated update session to each consumption meter of the group of consumption meters, and transmitting addressed update program segments to consumption meters in session. During the update session with a given consumption meter, any other consumption meter which is within communication range (8) will, if it receives the update segment, store it even though the segment is addressed to another meter. In an update session of a next meter, only segments not already stored from a previous session to another consumption meter are transmitted to the next meter.

17 Claims, 3 Drawing Sheets

(51) Int. Cl.
*G08C 19/06* (2006.01)
*G08C 19/04* (2006.01)
*G08C 19/10* (2006.01)
*H04Q 9/14* (2006.01)
*H04Q 9/00* (2006.01)
*G06F 9/445* (2006.01)

(58) Field of Classification Search
USPC ............ 340/870; 324/76.11–157; 702/57–84
See application file for complete search history.

(56) References Cited

U.S. PATENT DOCUMENTS

| | | | |
|---|---|---|---|
| 2006/0164257 A1* | 7/2006 | Giubbini | H04B 3/546 340/870.02 |
| 2006/0220843 A1* | 10/2006 | Broad | G08B 25/009 340/539.23 |
| 2009/0138617 A1* | 5/2009 | Veillette | G01D 4/004 709/238 |
| 2010/0169876 A1 | 7/2010 | Mann | |
| 2012/0201146 A1* | 8/2012 | Shuey | H04W 40/14 370/252 |

\* cited by examiner

CONSUMPTION METER WITH REMOTE PROGRAM UPDATE

CROSS REFERENCE TO RELATED APPLICATIONS

This application is a U.S. National Phase Application of PCT International Application Number PCT/DK2013/050128, filed on May 6, 2013, designating the United States of America and published in the English language, which is an International Application of and claims the benefit of priority to European Patent Application No. 12166957.6, filed on May 7, 2012. The disclosures of the above-referenced applications are hereby expressly incorporated by reference in their entireties.

FIELD OF THE INVENTION

The present invention relates to a system of consumption meters arranged in a communication network, and in particular to a system of consumption meters where the program data can be updated via the communication network.

BACKGROUND OF THE INVENTION

Consumption meters for measuring consumption data of a supplied utility, for example electricity meters, heat meters for district heating, and water meters for cold water, are often equipped with a communication unit for remote communication with the meter, and capabilities of being arranged in a communication network. Network enabled consumption meters greatly facilitates data collection, as well as remote control via transmission of control commands, and remote update via software upload.

Remote communication between a consumption meter and a central unit in a communication network can be obtained in a number of ways. Data is typically sent in the network by one of the standard means of broadcasting, multicasting or unicasting, employed singly or in combination. In general, a receiving unit in the network listen for signals on a given channel, and upon receipt of a candidate signal parses the signal header for initial evaluation to determine whether or not the signal is for the receiving unit. In broadcast, the signal does not contain specific addressing information of an intended receiver and any receiver capable of reading the signal can record the signal, whereas as in multicasting the signal contains address information to identify a receiver group, and in unicasting the signal contains address information to identify a single receiver. If a receiver receives a signal which includes an address different from its own address, it will disregard the signal.

A network of consumption meters may comprise a large number of individual units since every household in an area may contain one or more meters which communicate data back to a central unit, and it is normally a considerable communication task to individually communicate with each consumption meter in a given network. To reduce the total time of sending out information to every meter in a network, broadcasting can be used since it is a simple means for sending the same information out to a large number of receivers. It however comes with the expense of a limited control over the transmission since broadcasting is a unidirectional communication path. If it is important to more tightly control the transmission, unicast or multicast can be employed in a bi-directional manner, but at the expense of a high network load.

Network enabled consumption meters are typically equipped with an embedded microprocessor which contains control software, often referred to as firmware, and which is capable of performing various processing tasks based on the control software and on other software entities. Advantageously, the control software and possibly other software entities can be updated remotely via the network. To remotely update the control software of a consumption meter, a relative large amount of data needs to be transmitted to a large number of meters in the network. During an update process, there is thus a risk that some parts of the data are lost in the transmission, for example due to transmission collision. In connection with a control software upload, or upload of other core software entities, it is important that all data are received at each updated meter, otherwise it is not possible to make the exchange with the updated version of the software. Consequently an approach should be implemented which can guarantee this. However, there is generally a desire that the time it takes to update a group of consumption meters should be kept as low as possible.

WO 2005/015890 in the name of Enel Distribuzione discloses a system for remote distribution of program data to consumption meters. In a first phase of the update process unicasting is employed in order to individually send information to each meter relating to which data it should receive in order to receive a complete set of program data. In a second phase, the program data is broadcast. In a third phase each meter is queried successively for receipt status, and missing program data packets are re-broadcast. The third phase is continued until all meters report that they have received complete program data. In this system, a dedicated session between the data distributor and each meter is established a number of times, each followed by a broadcast of missing program data.

A similar approach is disclosed in WO 2008/130991 in the name of Elster Electricity.

SUMMARY OF THE INVENTION

It would be advantageous to achieve a system of consumption meters in a communication network where program data of the individual consumption meters can be remotely updated in a manner which ensures control over the update process and at the same time is capable of limiting the total update time of the program data for a large group of consumption meters.

To achieve such a system, there is provided, in a first aspect of the invention a system of a plurality of consumption meters each arranged for measuring consumption data of a supplied utility, and a data collector for collecting the consumption data, the consumption meters and the data collector being arranged in a communication network, each consumption meter comprises a processor for operating the consumption meter based on program data or by use of program data;

wherein the data collector is arranged for updating the program data of a group of consumption meters over the network by transmitting update program data as a series of update program segments from a distributor unit to each consumption meter of the group of consumption meters;

wherein the data collector establishes a dedicated update session to each consumption meter of the group of consumption meters, and wherein segments addressed to the consumption meter in session, are transmitted, and possibly retransmitted, until the consumption meter in session acknowledges receipt of all segments;

wherein, during the update session, a consumption meter to which an update program segment is not addressed, upon receipt of the segment, accepts the segment for storage;

and wherein, during the update session only segments not already stored from a previous session to another consumption meter are transmitted to the consumption meter in session.

A system is thereby provided which is based on unicasting in the sense that a dedicated session is established between the data collector and each consumption meter to provide update program data to each meter, but which takes advantage of the fact that data transmitted in a unicast session can be received and stored by other consumption meters within communication range. The term program data should be construed broadly to include computer code, computer readable instruction and other data structures suitable for influencing the operation of a microprocessor. Moreover, the specification that each consumption meter comprises a processor also encompasses the situation where the consumption meter comprises more than one processor for operating the consumption meter and where operation of the consumption meter is shared by more than one processor. In functional implementations with more than one processor the program data of one of, some of, or even all of the processors may be updated in accordance with the embodiments of the present invention.

By basing the update process on a unicast scheme, a tight control with the update process can be obtained, where only one session is established per meter, and where once the session has been completed, it is ensured that the meter in session has received all data relating to the update program data.

By enabling non-addressed consumption meters which "overhear" a data communication between the distributor of the update program and another device which is in the course of receiving update data to store the received data, already stored data does not need to be transmitted again to this consumption meter when it is in session, but only verified. The total time it takes to update the group of consumption meters is thereby reduced.

In the context of the present invention, "overhear" and "overhearing" is used for the process where a consumption meter is within communication range of a transmission to another meter so that the consumption meter can receive the signal to this other meter, but where the transmission is addressed to the other meter.

The data collector is in charge of the update sessions by establishing dedicated sessions to each of the consumption meters. While the data collector is the responsible device for the sessions, update program data need not be transmitted from the data collector during the update session, instead the data collector may instruct another device to transmit the update program segments, that is instruct another device to act as distributor unit. In general, the data collector itself may act as distributor unit, however a consumption meter or a network node device may be instructed to be distributor unit. Typically, the data collector acts as distributor unit for first level transmissions, whereas a network node may act as distributor unit for deeper level transmissions in a multihop network.

The consumption meter is equipped with communication capabilities. The elements and components for providing the communication capabilities may either be built together with the consumption meter, and even share components with the consumption meter, or may be housed separately and connected to the consumption meter in any suitable way to provide a network enabled meter.

In an important embodiment, the processor is a programmable processor for operating the consumption meter based on control program data, either in the form of firmware or higher level software structures capable of controlling the consumption meter.

An important application of the present invention is to update the control software. Nevertheless embodiments of the invention may advantageously be used for updating other data structures which are to be transmitted in a controlled way to a group of consumption meters. In an embodiment, the program data may be computer code or other forms of program data which is for use by the control program of the consumption meter or for use by an auxiliary device connected to the consumption meter. This may e.g. tariff structures, specific calculation algorithms, such as price calculation algorithms, network tables or control program data for auxiliary devices, such as auxiliary display devices or auxiliary sensor devices.

The communication circuit of a consumption meter may in different embodiments range from being functionally and physically integrated with the general circuitry of the consumption meter to functionally and physically separate from the general circuitry of the consumption meter. In the event that the communication circuit is provided in an integrated manner, the program data of the communication circuit may be updated together with the general control program of the consumption meter, whereas if the communication circuit is provided in a separate manner, the program data of the communication circuit may be updated as an auxiliary device.

The consumption meters may in embodiments be a charging consumption meters for charging an amount of a supplied utility. The consumption meter may be an energy meter for metering an amount of energy consumed, a heat meter for district heating, a cooling meter for district cooling, a water meter for distributed water, e.g. drinking water, a gas meter and/or an electricity meter. The consumption meter may be a legal meter, i.e. a meter which is subdued to regulatory demands. Such regulatory demands may be demands to the precision of the measurements.

In other aspects of the invention, there are provided a data collector as well as a consumption meter for use in a system according to the first aspect.

Additionally, in a further aspect of the invention, there is provided a method of distributing update program data in a system of a plurality of consumption meters each arranged for measuring consumption data of a supplied utility, and a data collector for collecting the consumption data, the consumption meters and the data collector being arranged in a communication network, each consumption meter comprises a processor for operating the consumption meter based on program data or by use of program data;

the method comprises distributing the update program data to a group of consumption meters over the network from a distributor unit to each consumption meter of the group of consumption meters;

the method further comprises:

arrange the update program data as a series of update program segments;

establish a dedicated update session between the data collector and each consumption meter of the group of consumption meters;

address each segment to the consumption meter in session, and transmit, and possibly retransmit, each segment until the consumption meter in session acknowledges receipt of all segments;

wherein, upon receipt of a program segment, determine the address of the program segment, if the program segment is addressed to the receiving consumption meter, accept the update program segment for storage and acknowledge receipt; whereas, if the program segment is not addressed to the receiving consumption meter, accept the update program segment for storage and do not acknowledge receipt;

and wherein, during the update session only segments not already stored from a previous session to another consumption meter are transmitted.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
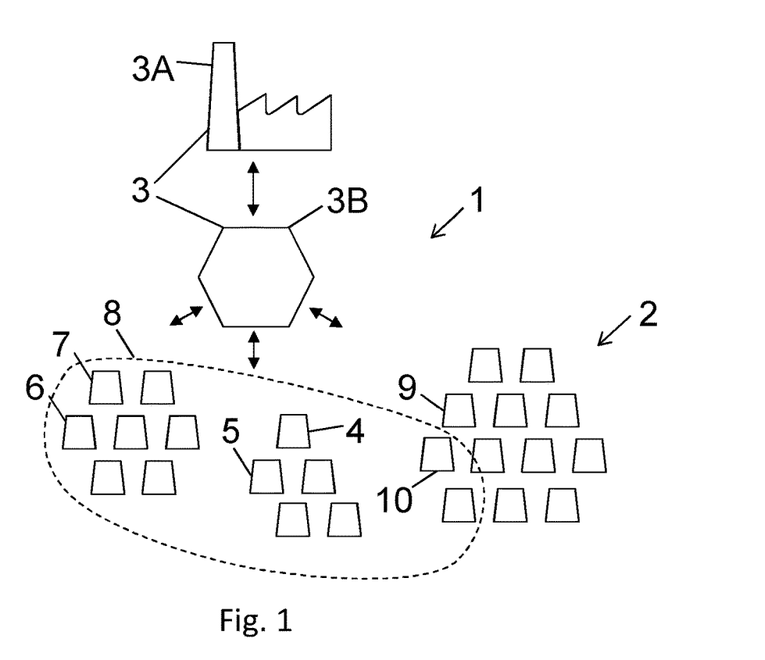
FIG. 1 illustrates an embodiment of a system of consumption meters and data collector units arranged in a communication network.

An embodiment of the invention is illustrated in FIG. 1. The figure illustrates a system 1 comprising a plurality of consumption meters 2 and a data collector 3, 3A, 3B, here in the form of a sub-collector and a main collector. The main collector being the collection system of the utility provider 3A, whereas the sub-collector being a concentrator unit 3B arranged as a concentrator node in the network to collect consumption data from a group of assigned consumption meters. In a general embodiment, a number of concentrators are present, each with a number of consumption meters assigned to it. Each of the consumption meters and the data collector comprises a communication unit for bi-directional data communication in the network, and each consumption meter stores a meter ID, so it is individually identifiable in the network. The total network is in an embodiment a radio network, however advantageously at least the network between the concentrator and the consumption meters is a radio network, whereas the link between the two collector parts may be of any suitable type. In general, the network may be any suitable network, including a power line carrier (PLC) network.

In an embodiment, the concentrator device 3B is instructed to update the control program or firmware of the group of consumption meters 2. A consumption meter is operated by logic programming at different levels ranging from basic operation of one or more microprocessors to higher level programming of programmable microprocessors. Some microprocessors may even be operated by an operative system. At the lowest level, the control program may be implemented by fixed code, however advanced processors comprises one or more programmable levels. Update of the control program encompasses exchange of part of, or even entire, computer code structures at any programming level of the control circuits of the consumption meter.

In connection with updating the control program, the control program is split into a number of program segments. Splitting a data program into segments in connection with data transmission of the program is generally known in the art of data transmission.

In an embodiment, in a first step, the concentrator 3B receives the update program from a controlling level and an instruction to update all consumption meters which are assigned to it. In general, however, any group or sub-group of the consumption meters which are assigned to the concentrator may be selected for update. As a first update step, the concentrator establishes a dedicated update session between itself and a first meter 4. During this session program segments are addressed to the first meter 4 and transmitted in the network. The consumption meters stores a meter ID for individual identification in the network. In embodiments, the meter ID may be used as the address, however, the network may also employ dynamic addressing.

In an embodiment, the concentrator transmits a first segment and awaits acknowledgement of receipt, once this acknowledgement is received a second segment is transmitted. If an acknowledgement is not received for a certain program segment, the concentrator resends the specific segment. Once all segments are sent and acknowledged by the first meter 4, the concentrator establishes a new update session to a second meter 5. The acknowledgement of receipt may be received after each segment, before a next segment is transmitted. In another embodiment, the segments may be send in groups, such as a few segments may be transmitted, and an acknowledgement is send for the few segments or for the received segments, if only some of them are received. The acknowledgement may be transmitted after a group of two, three, five, ten or other number of segments. Advantageously, only a small number of segments are transmitted between acknowledgements to obtain a tightly controlled transmission process. During the first session, the meter 5 was within communication range, thus all data transmissions send to the first meter 4 was received also by the second meter 5. In a normal unicast situation, the second meter disregards data addressed to another meter than the second meter, however in the present invention the second meter 5 is allowed to store the program segments that was send to the first meter 4. However, no acknowledgement of receipt is provided by the second meter during the session with the first meter. The program segments are merely stored at the second meter 5.

Since the second meter 5 was allowed to store program segments sent to the first meter 4 during the first session, only missing segments need to be sent to the second meter in the second session. If for example all segments were received at the second meter, the concentrator receives an acknowledgement to this and closes the session with the second meter and establishes a new session with the next (third) meter. At a certain point, a given meter 6 may have missed some of the program segments addressed to the first meter. These segments are then addressed to the meter 6 and transmitted one by one, each segment or groups of segments acknowledged by the meter 6. Since the meter 6 missed some of the data segments sent to the first meter 4, there is a certain probability the meters near this meter, e.g. the meter 7, has missed the same segments. When resending the program segments to the meter 6, the meter 7 will store any program segment which was also missed by this meter.

In the illustrated embodiment, only the meters within the area 8 are within direct communication range of the concentrator 3B. Thus all meters outside this area have missed all or many of the data segments sent to the first meter 4.

The consumption meter 9 is out of direct range of the concentrator. Consequently, the concentrator needs to send most if not all update program segments to the meter 9. Again, during the transmission of the segments to the meter 9, all meters which overhear this transmission will store overheard program segments. In an embodiment, the remaining meters may be in range of the transmission to the meter 9, and thus be able to receive most, if not all, segments. Thus, for the remaining meters, the concentrator may merely need to check for missing program segments, and possibly retransmit a few segments.

In this manner, all meters are provided with update program data (new firmware) where all the benefits of unicast are obtained in terms of process control and certainty of receipt. But identical program segments are not transmitted individually a high number of times thereby reducing the total time it takes to update the entire group of consumption meters.

In general, embodiments of the invention are advantageous for transmitting the same program data or computer code to a number of consumption meters. While an important application is to remotely update the firmware of a group of consumption meters, other applications may also benefit from using the principle of overhearing in accordance with embodiments of the present invention. Such applications include, but are not limited to, the following examples.

In one embodiment, the update program data is program data for use by the processor for operating the consumption meter. That is, the update program data does not relate to the control program as such, but to data structures which are used by the control program in connection with the operation of the meter. Such program data may e.g. be a tariff structure. In the event a new tariff structure is to be updated in a group of consumption meters, the tariff structure may be transmitted by use of embodiments of the present invention. In another example, the program data may be a calculation algorithm, e.g. for calculating the price based on the consumption. In yet another example, the program data may be network information such as route information. Route information, e.g. routing tables, may in embodiments be distributed to all the participating nodes for local processing in connection with routing data in the network. By placing routing tables in the consumption meters, route information may be removed from the normal data packets. In another example, the control program or other program may be based on program modules, where one or few modules are updated, but where the core structure of the program is maintained.

In another embodiment, the update program data is program data for use by an auxiliary device communicatively connected to the consumption meter. A consumption meter may be connected to auxiliary devices which are not necessarily connected to a network, or which are connected to an inferior network. For example, a consumption meter may be connected to an in-home display where it may be desirable to transmit update information for display to the consumer via the network of the consumption meters. The consumption meter may also be connected to separate modules, such as relay modules where it may be desirable to transfer data to the module via the consumption meter. Moreover, the consumption meter may act as a communication node for other devices, such as a communication node for battery operated water meters. Update program data may be transmitted to the water meter via the communication process of embodiments of the present invention. The auxiliary device may generally be housed separate from the consumption meter or in an integrated housing which comprises the auxiliary device. In particular, the auxiliary device may be a functional module attached to the consumption meter in any suitable way. In embodiments, the update program data is completely received at the consumption meter before retransmitted to the auxiliary device. Alternatively, the update program data may be transmitted to the auxiliary device concurrently with receipt at the consumption meter. Retransmission of the update program data to an auxiliary device can be done by a standard communication method in accordance with a specific connection between the consumption meter and the auxiliary device.

Figure 2:
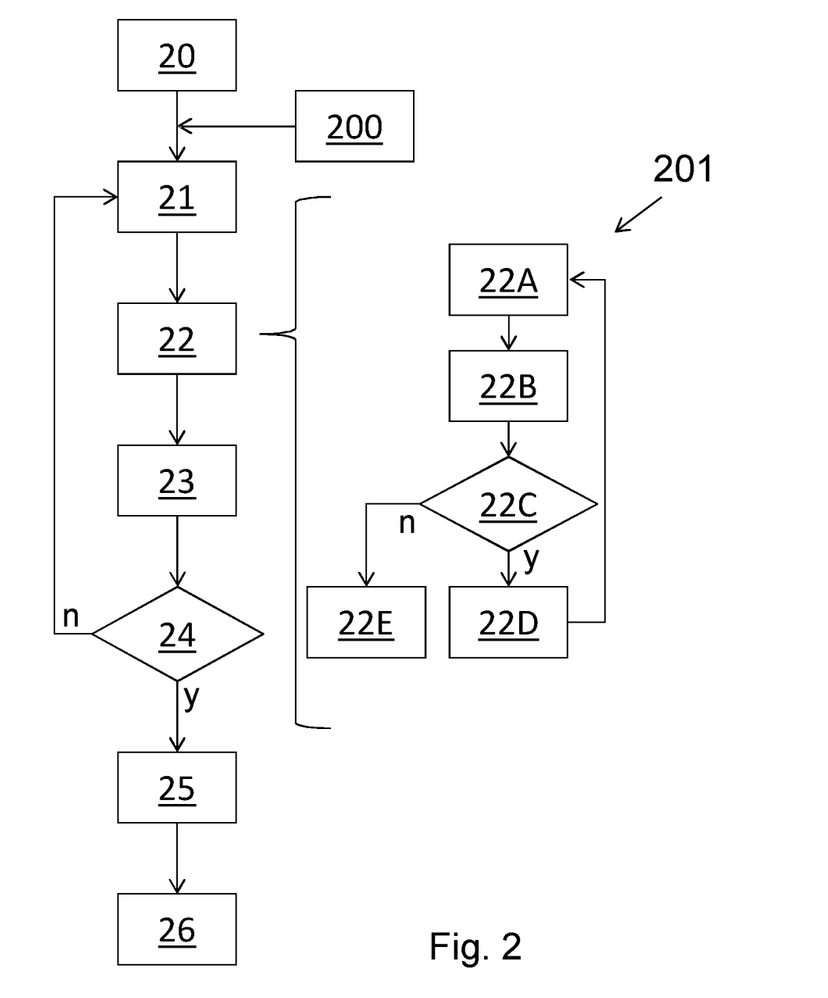
FIG. 2 illustrates a general flow diagram of embodiments for updating the program data of a group of consumption meters.

FIG. 2 illustrates a general flow diagram of embodiments of the invention for updating the program data of a group of consumption meters.

In a first step 20, the data collector, typically in the form of the concentrator, receives the update program and is instructed to update the program data of a specified group of consumption meters over the network. The group of consumption meters may be a group of meters arranged in the network or it may be all meters of a given network of consumption meters.

The concentrator is arranged for updating the program data by transmitting the update program as a series of update program segments to each consumption meter of the group of consumption meters. The concentrator typically manages the segmenting of the update program by use of a segmenting algorithm stored at the concentrator device. In general, any type of distributor device, may manage the segmenting prior to distributing the update program.

Figure 3:
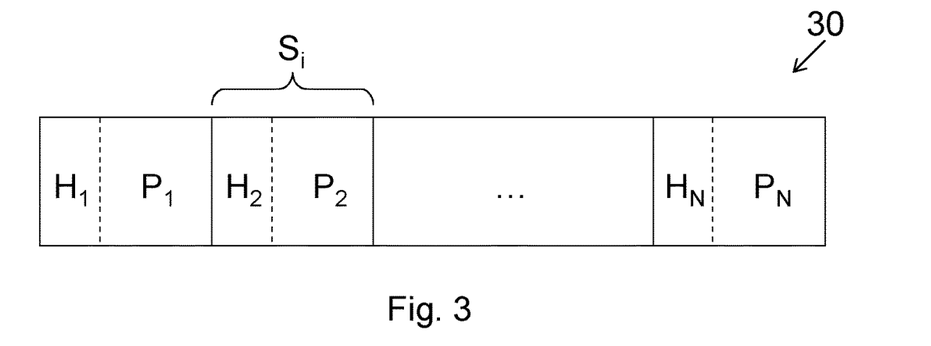
FIG. 3 schematically illustrates an example of a segmented program.

FIG. 3 schematically illustrates an example of a segmented program 30. Each update program segment is arranged as a data frame or data packet, designated $S_i$, i being an index. In the figure each segment is illustrated to comprise a payload, $P_i$, and a header $H_i$, which carries such information as receiver address, route information, segment number, etc. The header may be formed by a group of sub-headers which comprise parts that are dedicated to addressing information and parts that are dedicated to packet information. The payload contains the program part to be used in the update program. Moreover, even though not illustrated, each segment, $S_i$, may comprise further parts, such as a footer with control information, e.g. Cycling Redundancy Check (CRC) information. In general, each segment may be based on a layered data structure as is widespread in network communication.

Returning to FIG. 2, in step 21 the data collector establishes a dedicated update session to a (first) consumption meter of the group of consumption meters in order to transmit all segments of the update program to the first consumption meter.

In an embodiment, prior to the actual update of the consumption meters, the data collector announces 200 to all meters of the group of meters that they are to receive update program data. This announcement can be in the form of a multicast message to the group of meters or a series of unicast announcements. The announcement may include update program information, such as number of segments to be received, memory address of each segment, etc. to be used by the consumption meter in order to provide acknowledgements to the data collector during the update session. Based on the announcement each consumption meter may be able to build an update program table for it to be able to keep track of the segments it receives. In alternative embodiments an announcement is not used. Instead a first section of the update program may comprise information about the program, or the consumption meter may be instructed to acknowledge back to the concentrator after receipt of each program segment in a manner so that the concentrator can keep track of the segments received by the consumption meter in session.

Figure 4:
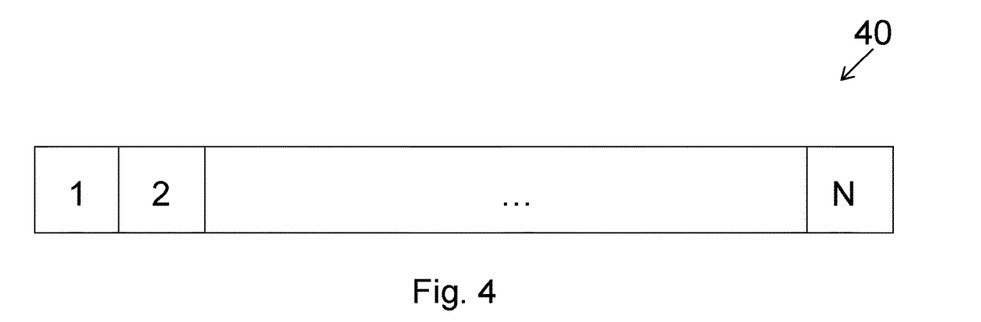
FIG. 4 schematically illustrates an example of a program table for building the update program at the receiving device.

FIG. 4 schematically illustrates an example of a program table 40, or program structure, used to build the update program at the receiving device. Here schematically illustrated by a numbered slot for each payload position. Other information may be used as well.

Returning to FIG. 2, in step 22 the concentrator addresses each segment with the meter ID of the consumption meter in session, and transmits, and possibly retransmits, each segment until the consumption meter in session acknowledges receipt of all segments.

In an embodiment 201, this may be done by sending a message 22A to the meter in session requesting it to report which segments it misses. Assuming that the consumption meter has received information relating to the overall structure of the update program, cf. FIG. 4, a first response 22B may be "I miss segments $S_1$ to $S_N$", i.e. all segments. At 22C, the concentrator determines whether or not the meter in session misses any segments. If yes (y) the concentrator sends 22D the first segment $S_1$ of the missing segments to the meter and either together with the segment or as a separate request 22A asks anew for missing segments.

If the concentrator instead receives the response that no (n) segments are missing 22E, it closes the session with the current meter.

In a next step 24, the concentrator determines whether or not all meters of the group of meters has been updated. If this is not the case (n), a session is initiated with a next meter 21.

Step 23 is a background process performed for all meters. In this process, a consumption meter either continuously or periodically analyses signals received at its receiver. In the event it detects an update program segment to a consumption meter with a different address or meter ID than its own, it accepts the update program segment for storage. In this manner, a meter which is within communication range benefits from a transmission which it can receive, but which is intended for another recipient. If an announcement was sent it may know that it soon will be in need of the data segments, otherwise it may be equipped with a storage area which stores all data segments that potentially could form part of an update program, and erases it or overwrites it after a certain time if not used. In this manner only program segments not already received and stored during a previous session, need to be resent. In the event it detects an update program segment addressed to it, it will follow the process 201.

In a next update session 21, the concentrator established a dedicated update session to a next consumption meter of the group of consumption meters in order to transmit all segments of the update program to, or ensure all segments are received at, the next consumption meter.

In one scenario, a next meter has already stored all segments of the update program. The flow diagram 201 would in this situation be:

A message is sent 22A to the meter requesting it to report which segments it misses. Since no segments are missing, a response 22B may be "I miss no segments". At 22C, the concentrator determines that no segments are missed, and at 22E it closes the session with the meter.

Figure 5:
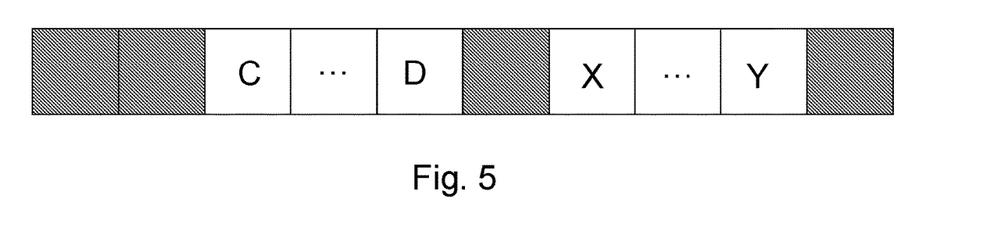
FIG. 5 schematically illustrates an example of a partly build update program at a receiving device.

In another scenario, a next meter misses segments $S_C$ to $S_D$ and $S_X$ to $S_Y$. This is illustrated in FIG. 5, where already stored program parts are grey, whereas missing parts are white.

After opening a session with the meter in 22A, the concentrator requests the meter to report which segments it misses. The meter reports that it misses $S_C$ to $S_D$, and in 22D segment $S_C$ is transmitted in an addressed transmission to the meter. In a reply to a next request, the meter reports that it misses $S_{C+1}$ to $S_D$, and so forth until it receives $S_D$. After having received $S_D$, it responds that it still misses $S_X$ to $S_Y$, etc.

The request to which segments that is missed can generally be send after each segment has been transmitted, or it can be send after a group of segments has been transmitted, so that the acknowledgement of receipt is received after a group of segments is received. In the event that the group of segments from $S_C$ to $S_D$ was transmitted without requesting an acknowledgement of missing segments in between, two situations can occur. If all segments were received correctly, the meter simply responds that it misses $S_X$ to $S_Y$, whereas, if the segments $S_{C+3}$ to $S_{C+5}$ were not received, it responds that these segments are still missing.

Again, any meter which overhears 23 the transmissions of the segments $S_C$ to $S_D$ and $S_X$ to $S_Y$ store such data segments, if not already stored.

In step 25 all meters of the group of meters has received the update program. If not already done, the consumption meter combines all data segments, either directly as received from the transmission, from stored segments or from a combination of received segments and stored segment to construct a complete update program.

In step 26, each consumption meter replaces its program with the update program. In an embodiment, the update program may be activated by an activation command transmitted to each meter. A consumption meter may start replacing the program upon receipt of the activation command. Alternatively may the activation command specify a replacement time instructing the consumption meter to replace the program at the specified replacement time. The replacement may be subject to further conditions, as will be discussed below.

In a general embodiment, a number of parallel update sessions may be established, however this leads to a rather complex process, since the network of consumption meters may be very complex, and consequently parallel processing of the update process may impose very complex restrictions on the update process to avoid problems relating to transmission collisions. Instead, the meters may advantageously be updated successively in series. Thus in an embodiment, the consumption meters of the group of consumption meters are successively updated, by successively establishing a dedicated update session to each consumption meter, and receiving an acknowledgement of receipt of all segments from the consumption meter in session before a next update session is established. In this manner a very simple process flow can be implemented, resulting in a high certainty of a fault free update process. The update time of the complete group may be higher with a serial update process than with a parallel update process. However, due to the fact that addressed data segments can be stored at a meter with a different meter ID than the address of the data segment, and that less transmission faults can be expected in a serial process, a serial update process may nevertheless be of advantage.

In general, a consumption meter can be implemented in a number of ways to ensure that it stores program segments of an update program not addressed to it. Any data packet carries a header which contains information that is needed to determine whether or not a received signal is intended for the meter or not, as well as other signal information. Based on information in the header, the consumption meter can be programmed to identify a part of the header which would indicate that the program segment should be stored in expectation that the program segment is part of a program update.

It may nevertheless be advantageous to provide a dedicated storage identifier or upload ID as part of the information carried in the segment of the update program, e.g. as part of the header. This storage identifier carries information relating to storage of the data segment by a consumption meter with a different ID than the address. For example, the identifier can carry a code which instructs the meter to store the segment if received, or which forbids the meter to store the segment if received. For example, if only a small group of meters needs update, it may be advantageous to forbid other meters to store the segments, effectively rendering the transmission into a unicast transmission. The storage identifier may also carry version information which renders it possible to transmit dedicated software version only to relevant meters.

In FIG. 1, the meters within the boundary 8 are first level meters, i.e. meters which are in direct communication range of the concentrator 3B. In order to communicate with meters outside this boundary a connector unit is needed. For example, one of the meters 10, may in addition to being a consumption meter, also implement the functionality of a repeater unit or alternatively a router unit, so that any communication directed to meters not within direct communication range of the concentrator is directed through the meter 10.

Figure 6:
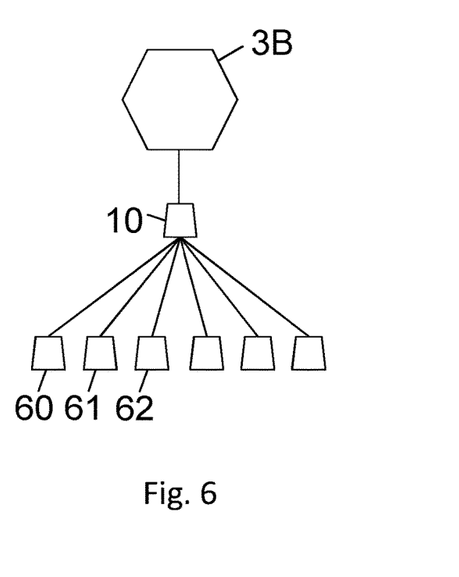
FIG. 6 schematically illustrates parts of FIG. 1 in relation to a multihop communication network.

Aspects related to multihop networks are further illustrated in FIG. 6. In this respect, a multihop network is to be understood as a network which comprises at least a second network level. That is it comprises at least one network level which is not in direct communication range with the collector, typically in the form of a concentrator device.

FIG. 6 schematically illustrates parts of FIG. 1 in relation to a multihop communication network, where elements of FIG. 1 are rearranged to underline the network structure. The concentrator is in direct communication range with the meter 10, but cannot directly reach the meters 60-62.

For first levels meters, i.e. meters in direct communication range of the concentrator, the concentrator is advantageously the distributer device, i.e. the device which stores the update program and manages the segmenting and addressing of the individual segments. In an advantageous embodiment, the distribution unit is shifted to a network unit acting as a connector node to a second level or higher level of the multihop network for the meters which are not directly reachable from the concentrator. Once the concentrator has transmitted all segments to the distributor node 10, and received acknowledgement of receipt, it may instruct the meter to act as a distributor node for the meters 60-62 to which it acts as repeater or router device.

In an embodiment, after having finalized the transmission of the update program to the meters within direct range, the concentrator instructs the meter 10 to be distributor device.

Figure 7:
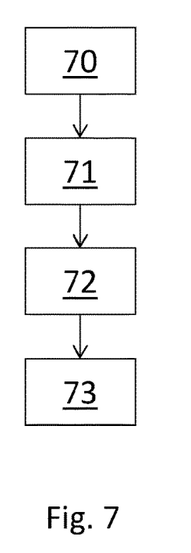
FIG. 7 illustrates an embodiment of a flow diagram relating to update of the program data in a multihop network.

FIG. 7 illustrates an embodiment of a flow diagram.

In step 70, the concentrator instructs meter 10 to transmit the update program to meter 60.

In step 71, the meter 10 addresses each segment of the update program to the address of the meter of the consumption meter 60, and transmits 72, and possibly retransmits, each segment until the consumption meter 60 acknowledges receipt of all segments. This transmission may be performed in a similar manner as in connection with the flow diagram 201 of FIG. 2, except that acknowledgements of each segment are sent to the distributor unit, i.e. to the meter 10. Once the meter 60 has received all segments, the distributor node reports 73 this to the concentrator. As a next session, the concentrator instructs the meter 10 to transmit the update program to a next meter, e.g. meter 61. Again, all segments already stored by the meter 61 from the transmissions to the meter 60 are not transmitted to the meter 61 in accordance with embodiments of the present invention.

In this manner, the concentrator is in charge of updating all meters within the group, however instead of retransmitting the update program a number of times to connector nodes in a multihop network, the stored data segments at the connector nodes are used for distributions to deeper levels.

In an embodiment, the data collector assigns a maximal distribution time to the distribution unit, which is the maximal time the distributor unit is permitted to use for transmitting update program data over the network without being in contact with the data collector. The contact between the distributor unit and the collector may be that the distributor unit reports the status of the on-going update process to the data collector. This allows the data collector to interrupt the update process in the event that the communication network is needed for an activity with a higher priority. In the event, that the network is not needed for a higher prioritized activity, the distributor unit is allowed to continue the update process by assigning it a new maximal distribution time.

In an embodiment, the network unit acting as the connector node to a second level or higher level of the multihop network may be a dedicated communication unit, e.g. a dedicated repeater device or dedicated router device. In such embodiment, the communication unit may be used as distributer unit along the lines as disclosed in connection with FIGS. 6 and 7.

In another embodiment, the network unit acting as the connector node to a second level or higher level of the multihop network may be a consumption meter which is not to be updated, but which nevertheless acts as a network node for consumption meters which are to be updated. Again, such consumption meter may be used as distributer unit along the lines as disclosed in connection with FIGS. 6 and 7.

In a further embodiment, the distributor unit may be a consumption meter which is added to the network with program data different from the program data of the consumption meters of the group of consumption meters, and wherein the program data of the added consumption meter becomes the update program data. The added consumption meter may be implemented with the functionality of extracting a copy of its own program data, or the added consumption meter may store a copy of its program data in a memory. Once the concentrator has been instructed to use an update program from an added meter, the concentrator instructs the added meter to transmit its program data to a first device, e.g. the concentrator itself, and then in accordance with embodiments of the present invention distribute the control program to a group of consumption meters.

The desire to in a fast manner distributing similar computer code to a large number of receiving entities is hampered if the computer code is to be distributed in a secure manner, i.e. by application of encryption. Embodiments of the present invention have the advantage that they support a number of security schemes, which does not require individual encrypted unicast transmission, but which nevertheless ensures a high security level.

In an embodiment, the update program may be encrypted with an encryption key that is known by all consumption meters in the group of consumption meters. If safe handling of such a shared encryption key is ensured, this may be a sufficient level of security. For example, the shared encryption key may be stored at the factory, or be distributed prior to the update process in encrypted form, e.g. encrypted with an individual encryption key.

In an embodiment, the update program may be activated by an individually addressed activation commands individually encrypted by an encryption key unique to each consumption meter. In this manner, at least the activation can be handled with a high security level.

In an embodiment, the announcement comprises an encryption key for decrypting the update program segments.

In an embodiment, the announcement may be encrypted by an encryption key unique to each consumption meter. In the event that the announcement comprises the shared encryption key, such an embodiment provide a very high level of security without jeopardizing the time it takes to update the program data of the group of consumption meters.

Although the present invention has been described in connection with the specified embodiments, it should not be construed as being in any way limited to the presented examples. The invention can be implemented by any suitable means; and the scope of the present invention is to be interpreted in the light of the accompanying claim set. Steps mentioned in a given order do not mean that the invention is limited to this order of executing the steps. Any alternation between steps is within the scope of the invention. Any reference signs in the claims should not be construed as limiting the scope.

The invention claimed is:

1. A system comprising a plurality of consumption meters each arranged for measuring consumption data of a supplied utility, and a data collector for collecting the consumption data, the consumption meters and the data collector being arranged in a communication network, wherein each consumption meter comprises a processor for operating the consumption meter based on program data or by use of program data;
  wherein the data collector is arranged for updating the program data of a group of consumption meters over the network by transmitting update program data as a series of update program segments from a distributor unit to each consumption meter of the group of consumption meters;
  wherein the data collector establishes a dedicated update to each consumption meter of the group of consumption meters, and wherein segments addressed to the consumption meter in session, are transmitted, and possibly retransmitted, until the consumption meter in session acknowledges receipt of all segments;
  wherein, during the update session, a consumption meter to which an update program segment is not addressed, upon receipt of the segment, accepts the segment for storage;
  wherein, during the update session only segments not already stored from a previous session to another consumption meter are transmitted to the consumption meter in session, and
  wherein each update program segment further comprises a storage identifier, which carries information relating to the storage of the segment by a consumption meter to which an update program segment is not addressed, the storage identifier carrying information a) allowing a first consumption meter to which the update program segment is not addressed to store the update program segment and b) forbidding a second consumption meter to which the update program segment is not addressed from storing the update program segment.

2. The system according to claim 1, wherein the processor is a programmable processor configured to operate the consumption meter based on control program data, and wherein the update program data is control program data for updating the control program data.

3. The system according to claim 1, wherein the update program data is program data that is usable by a control program of the consumption meter for operating the consumption meter.

4. The system according to claim 1, wherein the update program data is program data that is usable by an auxiliary device communicatively connected to the consumption meter.

5. The system according to claim 1, wherein each consumption meter of the group of consumption meters receives an announcement about an upcoming update session.

6. The system according to claim 1, wherein the consumption meters of the group of consumption meters are successively updated, by successively establishing a dedicated update session to each consumption meter, and receiving an acknowledgement of receipt of all segments from the consumption meter in session before a next update session is established.

7. The system according to claim 6, wherein the acknowledgement of receipt is received after each segment is transmitted and before a next segment is transmitted.

8. The system according to claim 6, wherein the acknowledgement of receipt is received after a group of segments is transmitted.

9. The system according to claim 1, wherein each consumption meter of the group of consumption meters receives an announcement about an upcoming update session, and wherein the announcement includes the storage identifier so that a consumption meter only stores an update program segment not addressed to it, if the storage identifier of the update program segment matches the storage identifier of the announcement.

10. The system according to claim 9, wherein the announcement comprises an encryption key for decrypting the update program segments, or wherein the announcement is encrypted by an encryption key unique to each consumption meter.

11. The system according to claim 1, wherein the distributor unit is selected from the group consisting of: a data collector, a consumption meter, a repeater unit and a router unit.

12. The system according to claim 1, wherein the group of consumption meters is part of a multihop communication network, and wherein the distribution unit is a network unit acting as a connector node to a second level or higher level of the multihop network.

13. The system according to claim 1, wherein the data collector assigns a maximal distribution time to the distribution unit, which is the maximal time the distributor unit is permitted to use for transmitting update the program data over the network without being in contact with the data collector.

14. The system according to claim 1, wherein the distributor unit is a consumption meter, which is added to the network with a program data different from the program data of the consumption meters of the group of consumption meters, and wherein the program data of the added consumption meter becomes the update program data.

15. The system according to claim 1, wherein the update program data is encrypted with an encryption key that is known by all consumption meters in the group of consumption meters.

16. The system according to claim 1, wherein the update program data is activated by an individually addressed activation command individually encrypted by an encryption key unique to each consumption meter.

17. A method of distributing update program data in a system of a plurality of consumption meters each arranged for measuring consumption data of a supplied utility, and a data collector for collecting the consumption data, the consumption meters and the data collector being arranged in a communication network, each consumption meter comprises a processor for operating the consumption meter based on program data or by use of program data;

the method comprises:
distributing the update program data to a group of consumption meters over the network from a distributor unit to each consumption meter of the group of consumption meters;
arranging the update program data as a series of update program segments;
establishing a dedicated update session between the data collector and each consumption meter of the group of consumption meters;
addressing each segment to the consumption meter in session; and
transmitting each segment until the consumption meter in session acknowledges receipt of all segments;
wherein, upon receipt of a program segment,
determining the address of the program segment and if the program segment is addressed to the receiving consumption meter, accepting the update program segment for storage and acknowledge receipt;
whereas, if the program segment is not addressed to the receiving consumption meter, a) accepting the update program segment for storage where a storage identifier allows the consumption meter to which the update program segment is not addressed to store the update program segment and do not acknowledge receipt, and b) not accepting the update program segment for storage where the storage identifier included in the update program segment forbids the consumption meter to which the update program segment is not addressed from storing the update program segment;
and wherein, during the update session only segments not already stored from a previous session to another consumption meter are transmitted.

* * * * *